United States Patent [19]

Seiz et al.

[11] 4,234,069
[45] Nov. 18, 1980

[54] VEHICLE SPEED CONTROL APPARATUS

[75] Inventors: Frederick G. Seiz, Telford; Carl G. Seiz, Hatfield, both of Pa.

[73] Assignee: Variable Control Systems, Inc., Telford, Pa.

[21] Appl. No.: 73,445

[22] Filed: Sep. 7, 1979

[51] Int. Cl.³ .............................................. B65G 13/00
[52] U.S. Cl. .................................. 193/35 A; 193/40; 188/139
[58] Field of Search .................. 193/38, 40, 41, 35 R, 193/35 A, 35 SS; 104/1 A, 107, 113, 147 R; 295/1; 188/180, 39, 58, 59, 181 R, 71.4, 184, 70, 185, 186, 187, 189, 139, 140; 105/180; 414/530; 74/230.17 R

[56] References Cited

U.S. PATENT DOCUMENTS

| | | | |
|---|---|---|---|
| 2,521,660 | 9/1950 | Westover | 105/180 |
| 2,631,342 | 3/1953 | Romine | 193/40 |
| 2,858,774 | 11/1958 | Batten | 105/425 |
| 2,949,863 | 8/1960 | Cozzdi | 193/35 C X |
| 3,054,195 | 10/1977 | Wahl | 193/35 R |
| 3,269,502 | 8/1966 | Kornylak | 193/35 |
| 3,344,893 | 10/1967 | Pelikan | 188/70 R |
| 3,572,471 | 3/1971 | Lieges | 188/144 |
| 3,576,242 | 4/1971 | Momma | 193/35 |
| 3,627,092 | 12/1971 | Fleischauer | 193/35 A |
| 3,650,216 | 3/1972 | Harwick et al. | 104/166 |
| 3,651,911 | 3/1972 | Kornylak | 193/35 |
| 3,700,078 | 10/1972 | Froio | 188/180 |
| 3,759,188 | 9/1973 | Woods | 104/168 |
| 3,871,501 | 3/1975 | Kornylak | 193/35 A |
| 3,915,094 | 10/1975 | Sawada | 104/130 |
| 3,952,839 | 4/1976 | Brown et al. | 188/62 |
| 4,000,796 | 1/1977 | Bolton | 193/35 A |
| 4,023,501 | 5/1977 | Haldimann | 104/147 R |
| 4,044,876 | 8/1977 | Hammond | 193/35 SS |
| 4,119,190 | 10/1978 | Kornylak | 193/35 A |

FOREIGN PATENT DOCUMENTS 2245952 9/1971 Fed. Rep. of Germany ........ 193/35 A

OTHER PUBLICATIONS

Bulletin—177–179 Kornylak Corp.
Bulletin—PL5-575 Speedways Conveyors, Inc.
Bulletin—3/75 Mallard Manufacturing Corp.
Bulletin—7002 Dexion.
Bulletin—Free Power Interlake, Inc.
Bulletin—918 Midland Ross, Inc.
Bulletin—10MDA578 Stor Dynamics Corp.
Bulletin—0677TK Tri-Corp.

Primary Examiner—Robert B. Reeves
Assistant Examiner—Gene A. Church
Attorney, Agent, or Firm—Stanley B. Kita

[57] ABSTRACT

Automatic braking apparatus for controlling the speed of a vehicle travelling downwardly on an inclined slope. The apparatus comprises a wheel housing, a pair of specially designed wheels mounted in the housing for combined rotary and axial motion, and a rail engageable between the wheels and moveable longitudinally relative thereto. The wheels have tapered camming surfaces which confront one another and annular braking surfaces facing outwardly in juxtaposition with respect to pads of friction material carried by the housing. A load applied between the rail and the wheels forces the wheels axially outward into engagement with the friction pads to retard rotation of the wheels and thereby to limit the relative velocity between the rail and the wheel housing. In one embodiment, the wheel housing is carried by a pallet and the rail is mounted stationary. Wedge means is provided at the lower end of the rail for engaging between the wheels relatively close to their rotational axis to arrest motion of the pallet. In another embodiment, the wheel housing mounts a plurality of the special wheels, and the rail depends from the pallet and engages between the wheels. In this embodiment, motion of the pallet is arrested by causing the rail to enter a zone where the wheels are spaced further apart. Other embodiments are also disclosed.

51 Claims, 14 Drawing Figures

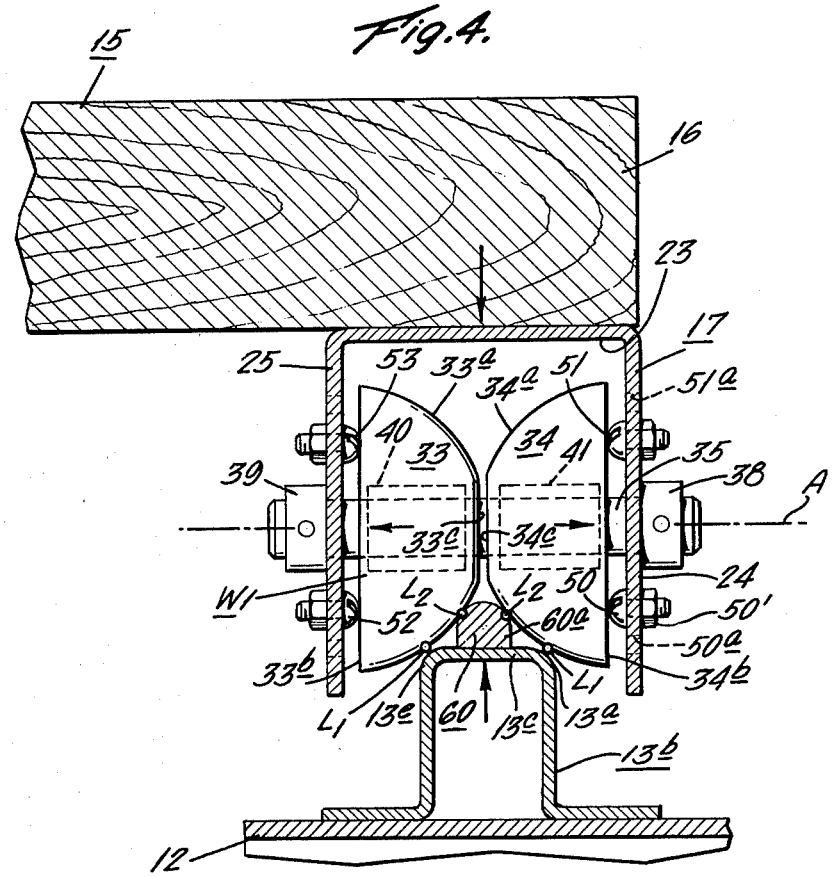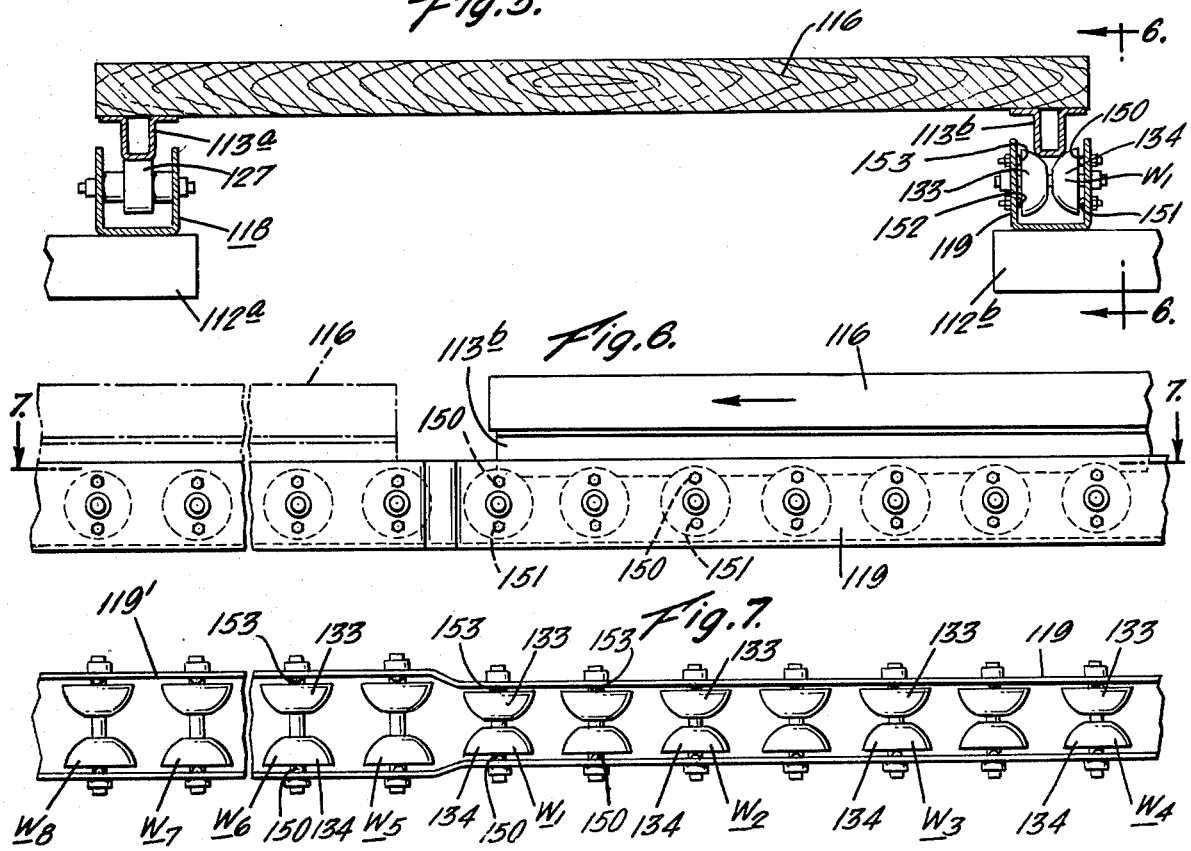

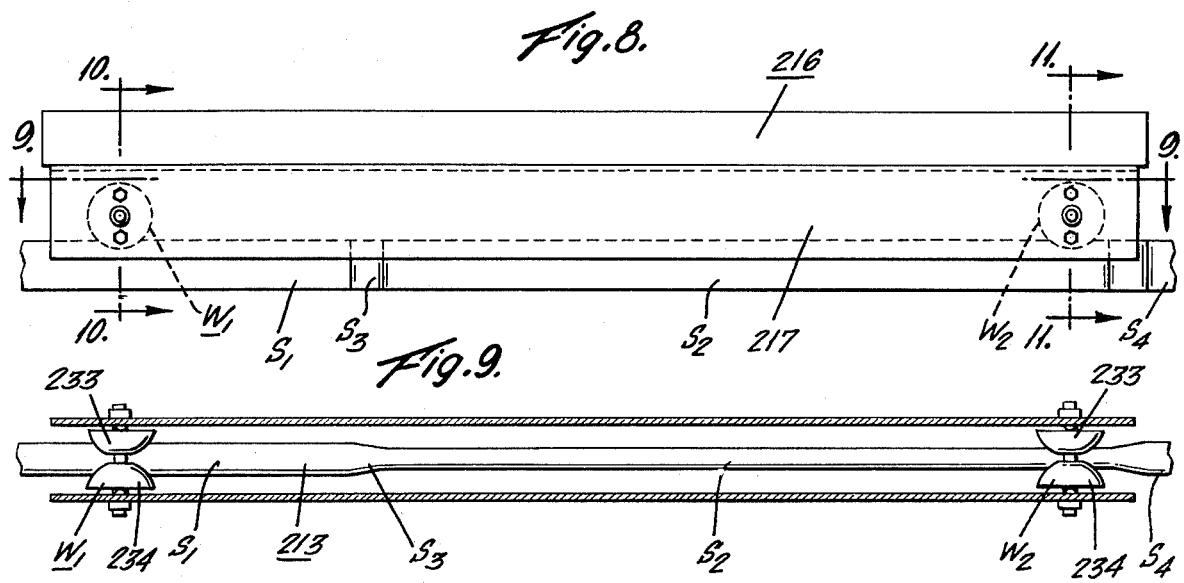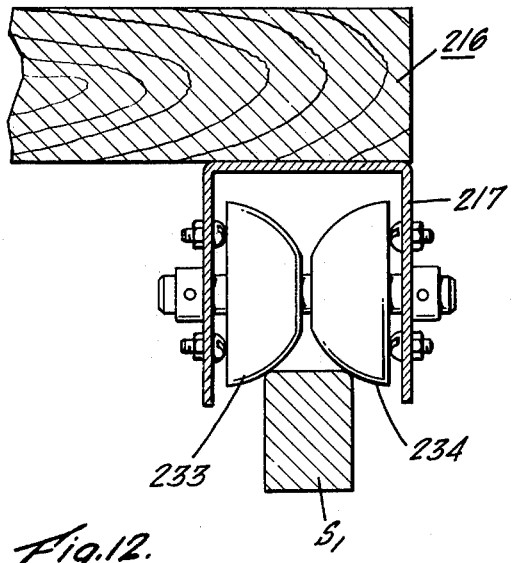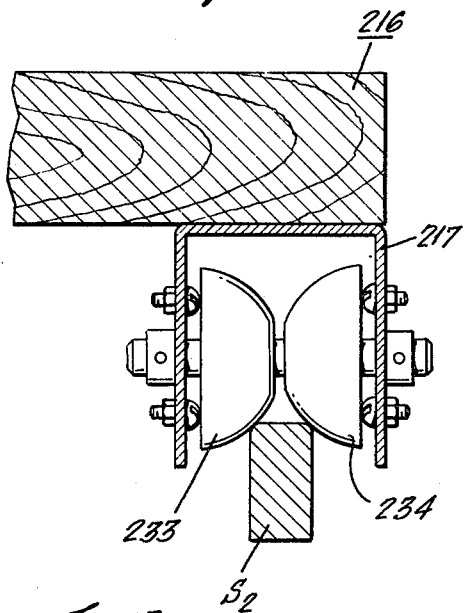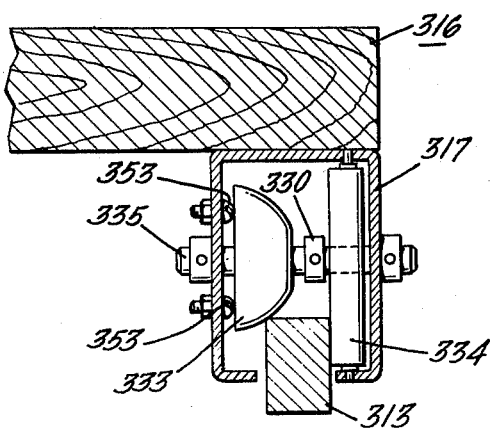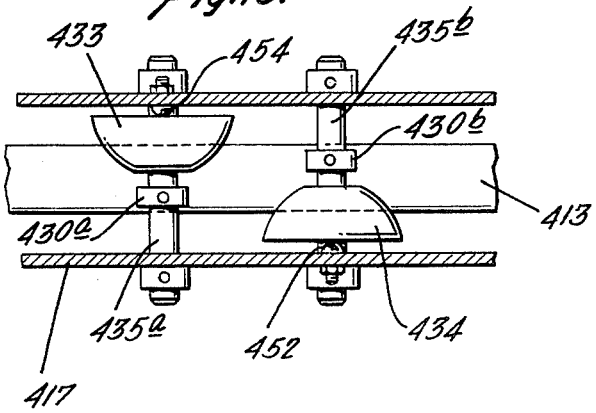

VEHICLE SPEED CONTROL APPARATUS

FIELD OF THE INVENTION

The present invention relates to automatic braking systems, and more particularly, the present invention relates to automatic braking systems for use in controlling the speed of pallets moving along guideways in a gravity flow storage rack system.

BACKGROUND OF THE INVENTION

Over the past several years, there has been an expanding utilization in warehouses of so-called gravity flow rack systems. In such systems, loaded pallets are designed to move by gravity down an inclined guideway from a higher level to a lower level. The pallets are loaded into the rack at the higher level and are unloaded therefrom at the lower level. Although gravity flow storage rack systems have provided substantial improvements in material handling, they have not been without certain drawbacks, one of which has been their cost. In systems employing roller conveyors, a substantial number of rollers are required, as well as suitable braking mechanisms. In systems where pallets are provided with wheels guided on rails, special braking mechanisms are required for the wheels.

Examples of roller conveyor systems, some of which have speed controlling mechanisms associated therewith, are disclosed in the following U.S. Pat. Nos. 4,119,190; 3,627,092; 4,044,876; 3,759,188; 4,054,195; and 3,269,502. Patents disclosing special types of materials for either roller peripheries or railways to control the speed of rail vehicles are disclosed in U.S. Pat. Nos. 3,650,216; 3,651,911; and 3,952,839. Various types of mechanical braking devices for use in controlling the speed of a vehicle moving down an incline are disclosed in the following U.S. Pat. Nos. 3,700,078; 3,576,242; 4,000,796; and 3,871,501. Still further miscellaneous types of vehicle speed control devices are disclosed in U.S. Pat. Nos. 4,023,501 and 3,915,094. Pallets having runners with recessed wheels are disclosed in U.S. Pat. Nos. 2,521,660 and 2,858,774. Moreover, a pallet having means operable automatically to detect a downgrade and to effect a braking action is disclosed in U.S. Pat. No. 3,572,471.

While many of the aforementioned patented devices may function satisfactorily for their intended purposes, there has been an everpresent demand for a vehicle speed control device which is inexpensive to manufacture, relatively maintenance free, and dependable and safe in operation.

OBJECTS OF THE INVENTION

With the foregoing in mind, a primary object of the present invention is to provide a novel speed control device which is inexpensive to manufacture.

It is another object of the present invention to provide a unique speed control device which has a minimum of moving parts and which, therefore, is dependable in operation and relatively maintenance free.

Still another object of the present invention is to provide an improved speed control device which tends to slow further the speed of the vehicle with which it is used in the event of excessive wear of its braking pads.

Yet another object of the present invention is to provide an improved system for controlling the speed of pallets moving down inclines in a gravity flow storage rack.

Another object of the present invention is to provide for a pallet a speed control structure which effects accurate speed control substantially independently of the load carried by the pallet.

A further object of the present invention is to provide a speed control device which can be mounted onto conventional pallets to control their speed in gravity flow storage systems.

SUMMARY OF THE INVENTION

A speed control device for a vehicle comprises a pair of specially shaped control wheels mounted for combined rotary and axial motion in a wheel housing moveable relative to an elongated rail. At least one, and preferably both, wheels have tapered camming surfaces which engage the rail and braking surfaces which confront pads of friction material carried inside the housing on opposite sides of the wheels. A load applied between the rail and wheels forces the wheels axially outward into engagement with the friction material for retarding rotation of the wheels and hence slowing relative motion between the rail and the wheel housing.

In one specific embodiment, the wheel housing includes a channel-shaped structure carried on the underside of a pallet and mounting a pair of such special wheel and friction pad assemblies in tandem therein for movement on a rail. The pallet has another wheel housing mounting rollers for movement on a parallel rail. At least one rail has a predetermined widthwise dimension along the major portion of its length, and it mounts at its lower end a narrower wedge member which functions to engage more deeply between the control wheels to increase outward pressure on the friction pads and thereby to arrest motion of the pallet.

In another specific embodiment, a pallet mounts a pair of rails to its underside for movement along a roller conveyor comprising one wheel housing mounting a series of rollers for engaging one of the runners and another wheel housing mounting a plurality of the aforedescribed control wheel and friction pad assemblies. In this embodiment, the motion of the pallet is arrested by causing it to advance onto a section of the wheel housing where the tapered control surfaces are spaced further apart so as to enable the rail to engage more deeply between the control wheels.

Some variations of the above embodiments are also disclosed.

BRIEF DESCRIPTION OF THE DRAWINGS

The foregoing and other objects, features and advantages of the present invention should become apparent from the following description taken in conjunction with the accompanying drawings, in which:

FIG. 4 is a greatly enlarged sectional view of the speed control apparatus mounted at the righthand end of the pallet illustrated in FIG. 2;

FIG. 5 is a view similar to FIG. 2 but illustrating a roller conveyor system for transporting a pallet having a pair of rails;

FIG. 6 is a sectional view taken on line 6—6 of FIG. 5 and illustrating in full line the position of a pallet moving leftward on a speed controlled section of the roller conveyor and illustrating in broken lines the position of the pallet after it has advanced onto a speed reducing portion of the conveyor;

FIG. 7 is a sectional view taken on line 7—7 of FIG. 6 to illustrate the different speed zones of the roller conveyor;

FIG. 8 is a side elevational view of a pallet mounted on a rail designed to vary the velocity of the pallet as it advances;

FIG. 9 is a sectional view taken on line 9—9 of FIG. 8 to illustrate the various widths of the rail illustrated in FIG. 8;

FIG. 10 is a greatly enlarged sectional view taken on line 10—10 of FIG. 8;

FIG. 11 is a greatly enlarged sectional view similar to FIG. 10 but taken on line 11—11 of FIG. 8;

FIG. 12 is a sectional view similar to FIG. 10 but illustrating one modification of the invention; and FIG. 13 is a fragmentary sectional view illustrating another modification of the invention.

DESCRIPTION OF PREFERRED EMBODIMENTS

Figure 1:
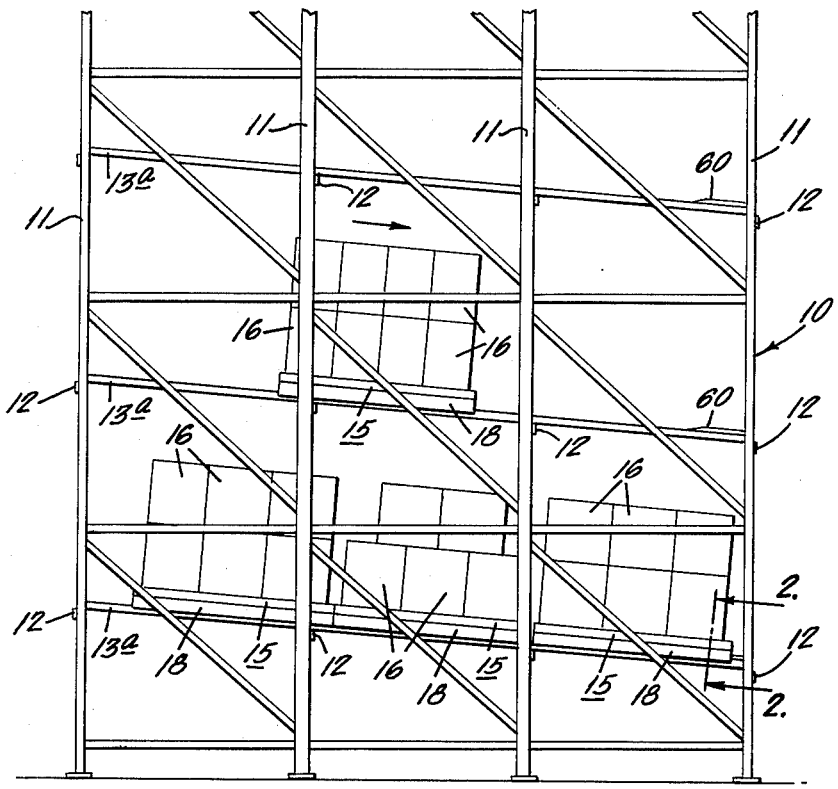
FIG. 1 is a side elevational view in reduced scale of a gravity flow storage system which embodies the present invention.

Referring now to the drawings, FIG. 1 illustrates a gravity-flow storage rack system in which the present invention finds particular utility. As best seen therein, the rack system includes an upstanding storage rack 10 having a series of uprights 11 mounting at various vertical levels support members 12 to which are fastened a pair of parallel rails 13a—13b. The rails 13a—13b are mounted in the rack 10 in inclined relation at a predetermined angle of inclination, usually in a range of ¼-½ inch per foot of slope. A pallet 15 containing a load, such as boxes of foodstuffs 16, is normally loaded on the rails 13a—13b at the left or higher end and travels by gravity rightward toward the lower end from which the loaded pallet is unloaded by conventional means such as a forklift truck or picker crane.

As described thus far, the gravity flow storage rack system is conventional.

As noted heretofore, one of the most difficult problems encountered in gravity flow storage systems is the problem of controlling the speed of the loaded pallet as it moves down the inclined rails and of stopping the patllet when it reaches the lower ends of the rails. The pallet must be stopped in a sufficiently gentle manner as to prevent the load carried thereon from spilling forwardly into the aisle in front of the rack. It should be apparent, therefore, that the velocity of the pallet must be positively controlled to prevent it from gaining momentum as it moves down the rails; otherwise the stopping problem is aggravated.

Figure 3:
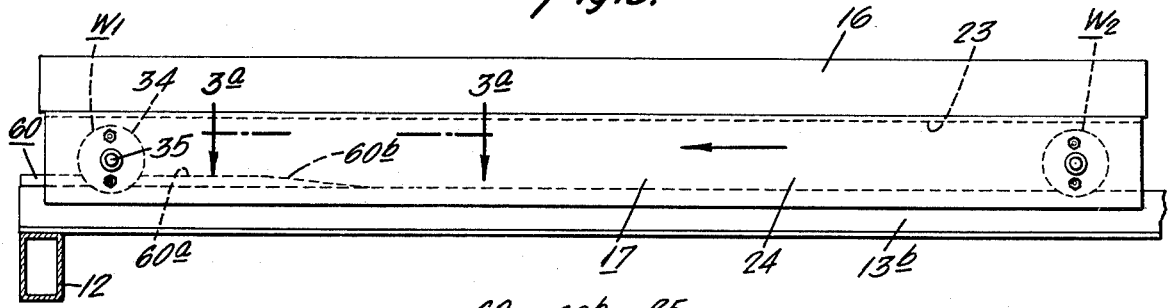
FIG. 3 is a sectional view taken on line 3—3 of FIG. 2.
Figure 3A:
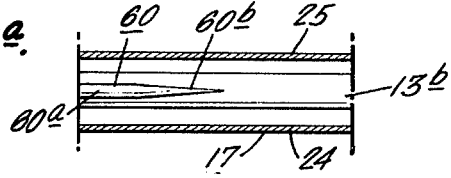
FIG. 3a is a fragmentary sectional view taken on line 3a—3a of FIG. 3.

In accordance with the present invention, the pallet 15 is provided with specially designed speed control means which controls the speed of the pallet 15 and arrests its motion when the pallet 15 reaches the front of the rack. To this end, the pallet 15 comprises a deck 16 and a pair of wheel housings 17 and 18 fastened to the underside of the deck so as to overlie the rails 13b and 13a, respectively. As best seen in FIG. 3, each wheel housing, such as the righthand housing 17, is elongated along the length of the rail 13b, and extends from front to rear of the deck 16. The wheel housings 17 and 18 are preferably of like construction, each having a channel-shaped cross-section with the housing 18 having a mounting flange 20 fastened to the deck 16 and a pair of flanges 21 and 22 depending from the mounting flange 20. The wheel housing 17 has a mounting flange 23 and corresponding depending flanges 24 and 25. Although a deck 16 of single thickness wood is illustrated, it should be understood that the deck 16 may be provided by various materials and constructions, including a pallet of conventional design.

One of the wheel housings, such as the lefthand housing 18, rotatably mounts a pair of rollers 27 for rotation about axles 28 which extend transversely through the wheel housing flanges 21 and 22. Preferably, anti-friction bearing, such as a roller or a ballbearing, is interposed between the wheel 20 and the axle 28. The axle 28 is removeably mounted to the flanges 21 and 22 by means of collars, cotter pins, springclip fasteners, or the like engaging outboard of the wheel housing flanges 21 and 22, respectively. The wheel housing flanges 21 and 22 preferably depend below the lower periphery of the roller 27 and extend downwardly slightly below the top of the rail 13a both to prevent derailment of the pallet 16 and to space the roller 27 from a support surface to prevent the pallet from rolling on the support surface when dismounted from the rack 10.

The righthand wheel housing 17 mounts at least one, and preferably a pair of wheel assemblies $W_1$ and $W_2$ which cooperate with the rail 13b to control the velocity of the pallet 15. In the embodiment illustrated in FIGS. 2-4, each wheel assembly, such as the front assembly $W_1$, comprises a pair of control wheels 33 and 34 each of which has a special shape designed to cooperate with the rail 13b to effect the desired speed control function in a manner to be described. Preferably, the wheels 33 and 34 are mounted in the housing 17 for rotation about a common axis provided by axle means 35 which extends through the wheel housing flanges 24 and 25 and which is fastened in place by means providing shoulders on the outsides of the flanges 24 and 25, such as the collars 38 and 39. The wheels 33 and 34 are mounted for combined rotary and axial motion about the axle 35 by means of anti-friction ball or roller bearings 40 and 41, respectively. Preferably, the axle 35 is of steel and the bearings 40 and 41 have inner and outer races with the inner race slidably engaging the axle 35 to afford axial movement between the wheels and the axle 35. If a hardened axle is used, the inner race may be omitted.

Each control wheel, such as the lefthand wheel 33, has a tapered camming surface 33a and an annular braking surface 33b spaced axially from the camming surface 33a. The righthand wheel 34 has similar surfaces 34a and 34b, respectively. The wheels 33 and 34 are mounted on the axle 35 with their tapered surfaces 33a and 34a confronting one another and with their braking surfaces 33b and 34b confronting the insides of the wheel housing flanges 25 and 24, respectively. With this structure, vertical loads directed in the manner illustrated by the arrows in FIG. 4 cause the wheels 33 and 34 to spread apart axially in the manner indicated by the arrows.

In order to retard the rotation of the wheels 33 and 34 and hence to control the speed of the pallet 15, friction pad means is carried by the wheel housing 17 and is disposed in the axial path of movement of the wheels 33 and 34 as they spread apart. In the illustrated embodiment, the friction pad means includes at least one, and preferably a pair of pads 50 and 51 removeably mounted in the wheel housing flange 24 in a vertical line at diametrical locations with respect to the axle 35. Similar pads 52 and 53 are mounted in a like manner to the other wheel housing flange 25. In the illustrated embodiment, each friction pad, such as the friction pad 50, is provided by means of a slotted roundhead bolt fabricated of a low cost long wearing polymeric material such as nylon. The pad 50 is fastened in place by a nut 50' to afford ready removal and replacement in the event of excessive wear. The slotted head of the bolt 50 confronts the control wheel braking surface 34$b$ and cooperates therewith to provide a self-cleaning function.

In the illustrated embodiment, the friction pads 50-53 are spaced radially outward from the rotational axis of the control wheels 33 and 34 a predetermined distance which corresponds to a desired velocity for a given incline. Preferably, however, each of the wheel housing flanges has a series of additional mounting holes, such as the holes 50$a$ and 51$a$ in the righthand flange 24, to enable the locations of the pads 50 and 51 to be changed in the event that a different design speed for the pallet 15 is desired. As will be described hereinafter, increasing the radial spacing between the pads decreases the pallet velocity, and decreasing the spacing increases the pallet velocity.

Referring again to FIG. 4, it may be seen that the rail 13$b$ has an upper surface or top 13$c$ of a predetermined widthwise dimension with edge surfaces 13$d$ and 13$e$ normally designed to contact the camming surfaces 33$a$ and 34$a$ of the control wheels 33 and 34 at the locations indicated at $L_1$ spaced radially outward from the rotational axis A of the wheels 33 and 34 a predetermined radial distance. When thus engaged, downward load on the wheel housing 17 causes the rail edges 13$d$ and 13$e$ to spread the wheels 33 and 34 axially outward in the direction indicated by the arrows and to cause their braking surfaces 33$b$ and 34$b$ to engage the friction pads 51-53 with a predetermined outward pressure related to the downward load. When the wheels 33 and 34 are rolling, this outward pressure creates between the braking surfaces and the friction pads friction forces acting in a direction counter to the rotation of the wheels 33 and 34 as the pallet advances downwardly on the rails 13$a$ and 13$b$.

From a theoretical standpoint, it is believed that the reaction forces between the rail edges, such as the edge 13$d$, and the camming surface 34$a$ of the wheel 34, act upwardly through locations $L_1$ in such a direction as to have a vertical component which is large relative to its horizontal component. The horizontal component is, of course, counteracted by the friction pads 50 and 51 and the housing flange 24. The housing flanges 24 and 25 are reinforced by virtue of the interengagement of the axle collars 38 and 39 with the outsides of both housing flanges 24 and 25, whereby the axle 35 accommodates in tension some of the outward load. Thus, when the control wheels 33 and 34 roll on a rail having a relatively wide top section the retarding friction forces are at a minimum for a given load and friction pad material and location.

In addition to providing means for controlling the momentum of the pallet 15, the present invention provides means for gently stopping the pallet 15 when it reaches its unloading station. In the present instance, motion of the pallet 15 is arrested by causing the outward pressure of the wheels 33 and 34 against their respective friction pads to increase at the lower end of the rail 13$b$. To this end, wedge means 60 is provided on the rail 13$b$ at the lower end thereof to urge the control wheels 33 and 34 apart when engaged therewith. As best seen in FIGS. 3$a$ and 4, the wedge means 60 is mounted stationary atop the rail 13$b$ centrally thereof and has an elongated working section 60$a$ and a tapered lead-in section 60$b$ feathering inwardly and downwardly toward the top 13$c$ of the rail 13$b$ in the direction toward the front of the pallet 15. The working section 60$a$ of the wedge means 60 has a widthwise dimension which is less than the widthwise dimension between the rail edges 13$d$ and 13$e$, and it has a height which is sufficient to separate the edges 13$d$ and 13$e$ slightly from the wheels 34 and 33 at the locations $L_1$ when the wedge means 60 engages the wheels 33 and 34 at the locations $L_2$ in the manner illustrated in FIG. 4. The points of engagement $L_2$ between the wedge member 60 and the camming surfaces 33$a$ and 34$a$ are closer to the rotational axis A of the wheels 33 and 34 than the points of engagement $L_1$. As a result, when the wedge member 60 is engaged with the wheels 33 and 34 in the manner illustrated in FIG. 4, the downward load applied by the wheels 33 and 34 to the rail 13$b$ is transferred from the points of engagement $L_1$ to the points of engagement $L_2$. This causes the reaction forces between the wedge member 60 and the wheels 33 and 34 at the points of engagement to have a greater horizontal component, and this greater horizontal component increases the pressure between the control wheel braking surfaces and their corresponding friction pads. Thus, the frictional forces tending to retard the rotation of the wheels 33 and 34 increases substantially, and these friction forces arrest the downward motion of the pallet 15. In the embodiment illustrated in FIGS. 1-4, only the front wheel assembly $W_1$ actually engages the wedge member 60 to stop the pallet 15. The rear wheel assembly $W_2$, preferably being like the front wheel assembly $W_1$, functions merely to provide the desired speed control for the pallet 15. During braking, tension in the axle 35 increases and restrains the tendency for the housing flanges 24 and 25 to bend outwardly due to the outward pressure applied thereto by the control wheels 33 and 34.

The camming surfaces 33$a$ and 34$a$ of the control wheels 33 and 34 have been described as being tapered. As used herein, the term tapered defines a straight or curved surface which extends both radially and axially outward with respect to the rotational axis A of the wheels 33 and 34. Preferably, each surface, such as the camming surface 34$a$, is convex so that the wheel 34 has a substantially hemispherical shape; however, the wheels 33 and 34 may have truncated suraces 33$c$ and 34$c$ to reduce the overall width of the assembly such as illustrated in FIG. 4. In order to effect a smooth stopping action of the pallet 15, the convex camming surface 34$a$ is preferably curved at least between the points $L_1$ and $L_2$ of the wheel, and preferably the curvature extends for a slight distance radially and axially therebeyond. As a result, the curved wheel surface 34$a$ between the points $L_1$ and $L_2$ effects a smooth engagement between the wheels 33 and 34 and the leading section 60$b$ of the wedge member 60 as the wheels advance to effect the desired transfer of load from the rail edges 13$d$ and 13$e$ to the working section 60$a$ of the wedge member 60. In the embodiment illustrated in FIG. 4, the camming surface 34$a$ has a constant radius of curvature throughout its entire extent.

By way of example, and not by way of limitation, it has been found that a pallet and rail assembly constructed along the lines illustrated in FIGS. 1–4 provides a substantially constant speed of about 25 fpm. when moving down rails having a slope of ⅜ in./ft. Tests have shown that the speed does not vary significantly when the pallet load ranges from its own weight to about 2500 lbs. In the test embodiment, the friction pads 50–53 were provided by nylon bolts spaced radially outward from the rotational axis A a distance of about ¾ in. The radius of curvature of each camming surface was 1¼ in. The wheels were fabricated of steel. While nylon on steel provides a coefficient of dynamic friction of about 0.25–0.35, it should be apparent that various other types of materials may be utilized to provide the desired degree of friction. For instance, other types of polymeric material such as UHMW polyethylene may be substituted. If a slower speed is desired for the pallet 15 for a given load, the friction pads 50 and 51 may be mounted radially further outward in the holes 50a and 51a. It is noted that the wheel housing flanges 24 and 25 in this embodiment also depend below the lower peripheries of the wheels 33 and 34 in the same manner as the flanges in the lefthand wheel housing 18 to space the wheels 33 and 34 from a support surface for preventing undesired rolling.

As described thus far, the pallet 15 mounts the wheel housings 17 and 18, and the rails 13a and 13b are mounted stationary. In another embodiment, illustrated in FIGS. 5–7, a similar speed control and stopping action is effected with slightly more expensive structure by mounting the rails to the pallet and mounting the wheel housings stationary. For this purpose, the pallet has a deck 116 which mounts along its underside in spaced parallel relation a pair of depending rails 113a and 113b. A pair of wheel housings 118 and 119 are mounted in spaced relation to support members 112a and 112b in inclined relation in the manner similar to rails 13a and 13b in the rack 10 illustrated in FIG. 1. In this embodiment, the lefthand wheel housing 118 mounts a series of rollers 127 in spaced relation along its length in a manner similar to the manner in which the rollers 27 are mounted in the embodiment of FIGS. 2–4. The righthand wheel housing 119 mounts a plurality of control wheel assemblies $W_1$–$W_4$ in spaced relation along substantially its entire length. The structure of the wheel assembly $W_1$ and its associated friction pads and the like are essentially the same as the structure of the corresponding wheel assemblies and friction pads illustrated in the embodiment of FIGS. 1–4. As a result, the wheels 133 and 134 move outwardly against their associated friction pads 150–153 to slow the pallet by retarding rotation of the wheels 133 and 134.

In order to arrest the forward motion of the pallet 116, the wheel housing 119 is provided with an enlarged section 119' which mounts a series of wheel assemblies $W_5$–$W_8$ in spaced relation. In this section, the spacing between the confronting tapered surfaces of the wheels 133 and 134 in each wheel assembly is greater in the corresponding spacing between the wheels in the wheel assemblies $W_1$–$W_4$. As a result, when the pallet 116 moves in the direction indicated by the arrow in FIG. 6 and enters the zone 119', its rail 113b engages deeper between the camming surfaces of the wheels 133 and 134 to force the wheels 133 and 134 axially outward with increased pressure thereby to increase the resistance of the wheels to rolling and thus to arrest the forward motion of the pallet 116. It should be noted that movement of the pallet 116 in the opposite direction, such as from the section 119' to the section 119, causes the rail 113b to engage between the wheels 133 snd 134 at a shallower depth, and this in turn has the effect of accelerating the pallet. It is noted that in this embodiment, as in the aforedescribed embodiment, the wheel housing flanges extend upwardly beyond the bottoms of the rails to prevent derailing of the pallet 116.

The present invention is particularly suited for use in varying the speed of a vehicle as it advances along a rail. To this end, as best seen in FIGS. 8–11, a vehicle 216, such as a pallet, has a wheel housing 217 mounting wheel assemblies $W_1$ and $W_2$ constructed along the lines illustrated in FIG. 4. The wheel assemblies $W_1$ and $W_2$ engage a rail 213 having one section $S_1$ (FIG. 10) with a predetermined widthwise dimension and another section $S_2$ with a different narrower widthwise dimension. A tapered transition section $S_3$ is provided between the sections $S_1$ and $S_2$. As best seen in FIG. 10, the rail 213 engages between the control wheels 233 and 234 at a location relatively close to their outer peripheries so as to create a controlled amount of friction between the wheels and their associated friction pads, as described above. As illustrated in FIG. 11, the track section $S_2$ engages between the control wheels 233 and 234 at a location closer to their rotational axis, and this has the effect of increasing the outward pressure exerted by the wheels 233 and 234 against their respective friction pads. As a result, when the wheels 233 and 234 engage the rail section $S_2$, the speed of the pallet 216 slows and, depending upon its velocity when it enters upon the section $S_2$, as well as the length of the section $S_2$, the pallet 216 may be brought to a complete stop. Depending upon both the width of the section $S_2$ and its length, the pallet 216 may be slowed slightly and accelerated again when the wheels 233 and 234 of the wheel assembly $W_2$ enter upon the wider rail section $S_4$.

Figure 2:
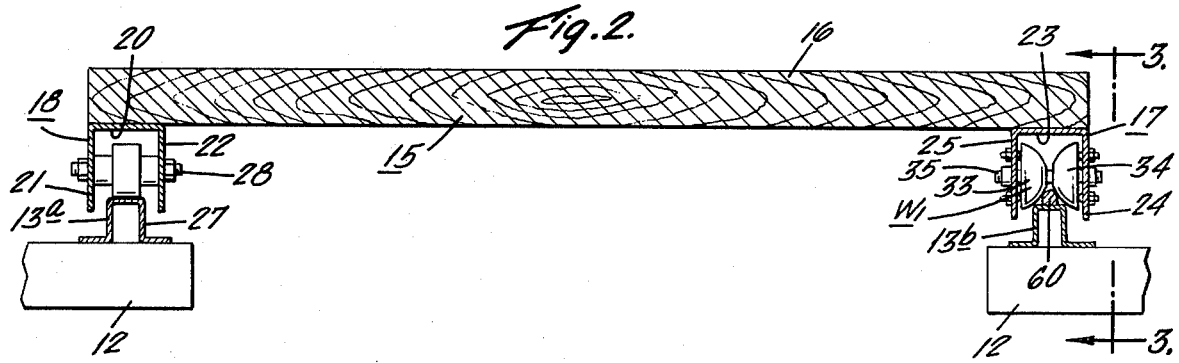
FIG. 2 is an enlarged sectional view taken on line 2—2 of FIG. 1.

A modified version of the embodiment illustrated in FIGS. 2–4 is illustrated in FIG. 12. Unlike the embodiment of FIG. 4, where a pair of control wheels 33 and 34 are mounted for rotation at a common axis, in the embodiment of FIG. 12, only a single control wheel 333 is mounted in a wheel housing 317 for rotation on an axle 335. A pair of friction pads 353 are mounted in the housing 317 in a manner similar to the friction pads described heretofore. In this embodiment, however, a roller 334 is mounted in the wheel housing 317 for rotation about a vertical axis offset slightly from the axle 335. The roller 334 functions to provide a reaction force acting rightward to counter the leftward force applied by the control wheel 333 to the housing 317. Otherwise, the control wheel 333 cooperates with the associated friction pads 353 to retard movement of the wheel housing 317 along the rail 313 in the manner described heretofore. A collar 330 is mounted centrally on the axle 335 to ensure disposition of the control wheel 333 to one side of the rail 313 when the wheel housing 317 and the deck 316 to which it is connected is initially placed on the rail 313.

The embodiment illustrated in FIG. 4 may be modified in yet another manner by mounting the control wheels 33 and 34 for rotation about different parallel axes. As best seen in FIG. 13, one control wheel 433 is mounted for rotation and axial motion about an axial 435a and the other control wheel 434 is mounted for similar motion about an axle 435b located adjacent the axle 435a. A collar 430a is mounted centrally on the axle 435a, and a collar 430b is also mounted similarly on the axle 435b to maintain the control wheels 433 and 434 on opposite sides of the centerline of the rail 413 with which the wheels 433 and 434 cooperate. Friction pads 452 and 454 are provided in the flanges of the wheel housing 417 to react with the braking surfaces of the wheels 433 and 434 in the manner described heretofore with respect to rail 413.

In view of the foregoing, it should be apparent that the present invention now provides a relatively simple device which automatically controls the speed of a pallet moving along a guideway in a gravity flow storage system. The speed control device has a minimum of moving parts and is, therefore, dependable in operation and relatively maintenance free. Moreover, any maintenance which may be required on the embodiments illustrated in FIGS. 1-4 and 12-13 may be performed outside of the warehouse in which the system is installed, and this is particularly advantageous when the gravity flow system is in a freezer. Furthermore, in the event of excessive wear of the friction pads, the control wheels would slide further in an axial direction and permit the rail to engage deeper between the camming surfaces of the wheels. This would increase outward pressure and hence friction and would automatically slow further the speed of the pallet. Hence, runaway pallets due to braking failure is avoided.

Another advantage of the present invention resides in the ability to utilize standard storage racks as gravity-flow racks. This is because conversion can be made simply by installing inclined rails and using pallets having the specially designed control wheels. As a result, conversion from static storage racks to dynamic or flow racks can be made years afterward, affording the warehouseman greater flexibility.

While various embodiments of the present invention have been described in detail, certain modifications, alterations and changes may be made without departing from the spirit and scope of the present invention as defined in the appended claims. For instance, the friction pads may be mounted on the control wheels and the braking surfaces provided on the wheel housing flanges. Depending on speed control desired, pallet loads, inclination, etc., both wheel housings may be provided with the specially designed control wheel assemblies.

We claim:

1. Speed control apparatus for a vehicle comprising:
   means providing a wheel housing,
   at least one control wheel disposed in said housing,
   means mounting said control wheel for rotation and axial motion about an axis,
   said control wheel having an inner camming surface tapering radially and axially outward from said axis and having a braking surface spaced axially from said camming surface,
   friction means carried by said housing for slidably engaging said braking surface as it rotates and for cooperating therewith to apply friction to said control wheel,
   rail means engaging said camming surface for urging said braking surface of said one wheel axially outward against said friction means in response to a load, and
   at least one reaction wheel carried by said housing for rotatably applying to said housing a reaction force opposite in direction to the outward axial force applied by said control wheel,
   whereby the speed of the vehicle is controlled by causing the friction means to retard rotation of the wheel.

2. Apparatus according to claim 1 wherein said reaction wheel is of like construction to said control wheel, and both wheels are mounted for rotary motion about a common axis.

3. Apparatus according to claim 2 wherein said reaction wheel has a camming and braking surface like said control wheel and is also mounted for axial motion about said common axis, and including like friction means carried by said housing on the side thereof opposite said first-mentioned friction means for slidably engaging said reaction wheel braking surface as it rotates.

4. Apparatus according to claim 1 wherein said rail means has a predetermined widthwise dimension between said control and reaction wheels, and including means to vary said widthwise dimension for causing the rail means to engage the control wheel at various depths and thereby to vary the speed of the vehicle.

5. Apparatus according to claim 1 wherein said rail means is mounted stationary, said wheel housing is carried by said vehicle, and including wedge means disposed on said rail means and having a narrower widthwise dimension for engaging deeply between said wheels to arrest motion of the vehicle.

6. Apparatus according to claim 1 wherein said wheel housing is mounted stationary and said rail means is carried by said vehicle and is thereby moveable relative to said wheel housing.

7. Apparatus according to claim 1 wherein said rail means has a predetermined widthwise dimension between said control and reaction wheels, and including means mounting a plurality of said wheels in spaced relation along the length of said housing with a greater spacing therebetween than the others to afford deep engagement of said rail means therewith and thereby to arrest motion of the vehicle.

8. Apparatus according to claim 1 wherein said pad of friction material is located radially outward of said axis at a predetermined location related to vehicle design speed.

9. Apparatus according to claim 1 wherein said camming surface is convex, and said rail means engages said camming surface at different radial locations to vary the speed of the vehicle with engagement at smaller radial locations tending to decrease the speed of the vehicle.

10. For use in a gravity flow storage rack mounting at least a pair of rails in inclined spaced parallel relation, a pallet comprising:
   a pair of channel-shaped wheel housings disposed in parallel relation;
   a deck carried by said wheel housings;
   a pair of wheel assemblies mounted in tandem in each wheel housing for running on said rails;
   at least one of said pair of wheel assemblies in one wheel housing including:
      a pair of wheels each having a tapered inner rail engaging surface and an annular outer braking surface,
      axle means mounted across said wheel housing to mount said wheels for combined rotary and axial motion.
      said wheels being disposed on said axle means with their tapered surfaces in confronting relation, and
      means providing between said outer wheel surface and said wheel housing a pad of friction material providing therebetween a predetermined coefficient of dynamic friction operable to apply to the wheels a friction force related to the load on the deck.

11. Apparatus according to claim 10 wherein both of said wheel assemblies and friction pad means in said housing are of like construction.

12. Apparatus according to claim 10 wherein each wheel housing includes a pair of flanges depending from said deck below the lower peripheries of said wheel assemblies to space the wheels from a support surface for preventing the pallet from rolling when dismounted from the rails.

13. Apparatus according to claim 10 wherein the pair of wheel assemblies in the other wheel housing includes an axle and a roller having a cylndrical rail engaging periphery.

14. Apparatus according to claim 10 wherein said wheel housing has a pair of flanges and said friction pad means is mounted to said flanges and protrudes inwardly therefrom to engage said outer wheel surface inwardly of its periphery.

15. Apparatus according to claim 14 wherein said friction pad means includes at least one bolt removeably mounted in said wheel housing flange.

16. Apparatus according to claim 15 wherein said bolt is fabricated of long wearing polymeric material and has a convex head confronting said outer wheel surface.

17. Apparatus according to claim 16 wherein said convex bolt head has a slot confronting said outer wheel surface.

18. Apparatus according to claim 15 including a plurality of bolts of like construction spaced apart about said axle means.

19. Apparatus according to claim 10 wherein said outer wheel surface is fabricated of metal and said friction pad is fabricated of long wearing polymeric material.

20. Apparatus according to claim 19 wherein said metal is steel and said polymeric material is nylon.

21. Apparatus according to claim 10 wherein said wheel housing includes a pair of flanges disposed outboard of said wheels, and said wheel mounting axle means includes an axle extending across said flanges and antifriction bearing means rotatably mounting said wheels to said axle.

22. Apparatus according to claim 21 including means providing shoulders on said axle means outboard of said flanges to restrain outward motion of said flanges.

23. Apparatus according to claim 10 wherein said camming surface on each wheel is convex and substantially hemispherical in shape.

24. A gravity flow storage rack system comprising:
a support structure,
a pair of rails mounted in said support structure in inclined parallel relation having an upper loading end and a lower unloading end,
a plurality of pallets adapted to travel on said rail means,
each pallet including a deck, a pair of wheel housings each having flanges depending from said deck alongside said rails, and a pair of wheel assemblies mounted in tandem in each wheel housing,
at least one of the wheel assemblies in one of the wheel housings including a pair of control wheels mounted for combined rotary and axial motion about an axis transverse to said rails, each of said pair of wheels having a tapered rail engaging camming surface and an annular braking surface, said wheels being disposed in said housing with their tapered surfaces confronting one another,
means providing in said one wheel housing a pad of friction material juxtaposed relative to said braking surfaces of said pair of control wheels for engaging the same when the pallet is mounted on the rails to apply friction forces tending to retard wheel rotation, and
means located adjacent said lower end of said rails for arresting motion of said pallet,
whereby the pallet descends on the rails at a controlled velocity and is arrested at the lower end.

25. Apparatus according to claim 24 wherein said tapered control surfaces are convex and said arresting means includes wedge means disposed along said control wheel engaged rail to interengage between said control wheels for increasing friction between them and their friction pads to arrest the pallet.

26. Apparatus according to claim 24 wherein said control wheel engaged rail has a predetermined widthwise dimension along substantially its entire length, and said arresting means includes a rail section having a widthwise dimension which is narrower than said predetermined rail dimension to engage deeper between said control wheels to raise them from the rail to thereby arrest motion of the pallet.

27. Apparatus according to claim 24 wherein said one wheel housing mounts another wheel assembly and friction pad means of like construction in tandem therewith.

28. Apparatus according to claim 24 wherein said wheel housing flanges depend below the lower peripheries of said wheels to space the same from a support surface to prevent the pallet from rolling when dismounted from the rails.

29. Apparatus according to claim 24 wherein the other of said wheel housings mounts a pair of rollers for rolling on the other of said pair of rails.

30. Apparatus according to claim 24 wherein said camming surface is convex and said friction pad means includes at least one bolt mounted in each wheel housing flange for operatively engaging said braking surface.

31. A gravity flow storage rack system, comprising:
a support structure,
a pair of elongated wheel housings disposed in inclined parallel relation in said support structure,
a pallet having a deck and a pair of rails depending in parallel relation therefrom for movement along said wheel housings,
at least one of said wheel housings mounted in tandem a plurality of wheel assemblies adapted to engage one of said pallet rails,
each of said wheel assemblies including:
a pair of wheels each having a tapered inner rail engaging surface and an annular outer braking surface,
axle means mounted across said wheel housing to mount said wheels for combined rotary and axial motion,
said wheels being disposed on said axle means with their tapered surfaces in confronting relation; and
means located between said outer wheel surface and said wheel housing providing a pad of friction material operable to apply to the rail friction forces related to the load on the deck when the pallet is mounted with its rail engaged between the tapered camming surfaces of the wheels.

32. Apparatus according to claim 31 wherein each wheel housing has a pair of flanges projecting upwardly beyond the upper peripheries of said wheel assemblies to prevent derailing of the pallet.

33. Apparatus according to claim 31 wherein the other of said wheel housings mounts a plurality of rollers adapted to engage the underside of the other of said pallet rails.

34. Apparatus according to claim 31 wherein said plurality of wheel assemblies are mounted with their tapered surfaces spaced apart a predetermined axial distance related to the width of the rail, and including another plurality of like wheels mounted in a group in said wheel housing with their tapered surfaces spaced apart a greater axial distance for affording deeper engagement therewith of the rail to arrest motion of the pallet when it advances over said group of wheel assemblies.

35. Apparatus according to claim 31 wherein said camming surface is convex and said friction pad means includes at least one bolt mounted in each wheel housing for operatively engaging said braking surface.

36. Apparatus for controlling the speed of a wheeled vehicle, comprising:
 a wheel housing carried by the vehicle,
 a pair of wheels mounted for rotation about a common axis in said housing, each of said wheels having a convex inner rolling surface on one side and an annular outer braking surface on the other side,
 means mounting said wheels in said housing with their convex surfaces confronting one another and affording combined rotational and axial motion,
 means providing between said outer braking surface and said housing a pad of friction material operable to apply a predetermined drag against rotation of each wheel, and
 rail means engaging between said convex surfaces to support and guide said rollers, said rail means having at least two zones of different width and a tapered transition zone therebetween,
 said vehicle tending, when under a constant propulsive force, to slow down when said wheels are rolling in a direction from greater rail width to narrower rail width and tending to accelerate when said wheels are rolling in the opposite direction.

37. A speed control device for a vehicle adapted to travel on a rail, comprising:
 means on said vehicle providing a pair of spaced reaction surfaces extending along opposite sides of the rail,
 a pair of wheels disposed between said reaction surfaces for supporting the vehicle and controlling its speed,
 each wheel having an inner tapered rail engaging surface and an outer surface, said wheels being disposed with their tapered surfaces confronting one another and their outer surfaces confronting said reaction surfaces,
 means mounting said wheels for combined rotary motion on said rail and axial motion transverse thereto, and
 wedge means on the rail for engaging between the tapered wheel surfaces closer to their rotational axis then said rail as the vehicle advances to urge the wheels into tight engagement with said reaction surfaces and thereby to arrest motion of the vehicle.

38. Speed control apparatus for a rail supported and guided vehicle, comprising:
 a rail,
 a pair of flanges depending from said vehicle along opposite sides of said rail,
 a pair of wheels disposed between said flanges, each wheel having a convex inner track-engaging surface and an annular flange-confronting outer surface,
 axle means mounting said wheels for rotary and axial motion between said flanges,
 means providing between said flanges and said outer surfaces of said wheels a pad of material having a predetermined coefficient of dynamic friction therebetween,
 said convex wheel surfaces cooperating with said rail to force the wheels axially toward said flanges to apply against said friction means a pressure related to the load on the axle,
 whereby the heavier the axle load the greater the friction applied to the wheel and the greater the resistance of the wheels to rolling.

39. Apparatus according to claim 38 wherein said rail is inclined and said coefficient of friction is related to the angle of inclination and radial location with respect to the axle means in such a manner as to cause the vehicle to advance at a substantially constant velocity on the rail.

40. Apparatus according to claim 39 wherein said relation provides a coefficient of dynamic friction of about 0.25 to about 0.35 when the inclination of said rail is in a range of about $\frac{1}{4}''$ to about $\frac{1}{2}''$ per foot and the pad of friction material is located about $\frac{3}{4}''$ from the rotational axis of the wheels.

41. Apparatus for controlling the speed of a wheeled vehicle, comprising:
 a wheel housing adapted to mount to the vehicle and having a pair of flanges and an axle extending between the flanges;
 means providing a reaction surface inside said flanges;
 a pair of wheels mounted on said axle in said wheel housing for combined rotational and axial motion; each wheel having a convex inner surface and an outer surface, said wheels being disposed on said axle with their convex surfaces confronting one another and said outer surfaces confronting said reaction surfaces;
 said reaction surfaces and outer wheel surfaces being of preselected materials providing a predetermined coefficient of dynamic friction therebetween;
 means providing a pair of track edges engaging said convex wheel surfaces at spaced transverse locations to support said wheels for rolling motion thereon; and
 means connecting said track edge means for gradually varying the spacing between said track edges to adjust the pressure engagement and hence friction between said reaction surfaces and said outer wheel surfaces and thereby to control the speed of the vehicle as it advances;
 whereby under a constant propulsive force, decreasing the spacing between the edges increases the friction on the wheels to slow the vehicle and increasing the spacing decreases the friction to accelerate the vehicle.

42. For use in controlling the speed of a vehicle adapted to advance along an inclined rail having a predetermined width, speed control apparatus comprising:
   a wheel housing adapted to mount to the vehicle;
   a pair of speed control wheels disposed in the housing;
   each wheel having a convex camming surface and an annular braking surface;
   axle means mounting said wheels in said housing with the camming surfaces confronting one another;
   anti-friction bearing means rotatably and axially slidingly mounting said wheels on said axle means in said housing;
   at least one pad of friction material carried by said wheel housing and operatively engaging each braking surface when a load is applied to said wheel housing to cause a pressure related to the load to be applied therebetween,
   said camming surfaces engaging said rail at a predetermined location spaced radially from the rotational axis of the wheels, and
   means located on the rail for engaging between said camming surfaces at a location closer to said rotational axis than said predetermined location for wedging said wheels outwardly and applying pressure greater than said load related pressure,
   whereby the increase in pressure caused by the engagement of the wedge means between the wheels arrests forward motion of the vehicle.

43. Apparatus according to claim 42 wherein said wheel housing has a pair of flanges disposed outboard of said wheels along opposite sides of said rail and said friction pads are interposed between said braking surfaces and said flanges, and said axle means extends through said flanges and engages the outsides thereof for reacting in tension against the outward pressure applied by the wheels to the friction pads.

44. Apparatus according to claim 42 wherein said friction pads are disposed in vertically arranged pairs on diametrically opposite sides of the axle and are removeably mounted to said housing.

45. Apparatus according to claim 42 wherein said camming surface is curved and has a constant radius of curvature having an arcuate extent at least between said locations at which the camming surfaces engage the rail and the wedge means.

46. Apparatus according to claim 45 wherein said friction pad provides a coefficient of dynamic friction between itself and said braking surface of about 0.25 to about 0.35 at a distance of about $\frac{3}{4}''$ from the axis of the axle means.

47. Apparatus according to claim 46 wherein said radius of curvature is about 1.25", said friction pad is of high density polymeric material, and said braking surface is steel.

48. A speed control device for a vehicle adapted to travel on a rail, comprising:
   means providing on said vehicle a pair of wheels rotatably engaging opposite sides of said rail,
   at least one of said wheels being mounted for combined rotary and axial motion and having a tapered camming surface engaging the rail, said one wheel tending when loaded to move axially on its rotational axis away from the rail, and
   braking means carried by said vehicle and operable upon said axial motion of said one wheel to retard motion of the vehicle along the rail.

49. A speed control device according to claim 48 wherein said vehicle has a pair of reaction surfaces disposed outboard of said rail with said wheels mounted therebetween for rotation and axial motion on a common axis, both of said wheels being of like construction with each having a convex camming surface engaging said rail and a braking surface confronting said reaction surface, said braking and reaction surfaces having therebetween a predetermined coefficient of dynamic friction providing friction drag forces on the wheels as the vehicle advances on the rail.

50. Apparatus according to claim 48 where said other wheel includes a roller mounted in said housing for rotation about a vertical axis.

51. Apparatus according to claim 48 wherein said other wheel is of like construction to said first-mentioned wheel and is mounted to said vehicle for similar axial and rotary motion about an axis parallel to said first-mentioned axis.

* * * * *